(12) United States Patent
Levy et al.

(10) Patent No.: US 10,740,266 B2
(45) Date of Patent: Aug. 11, 2020

(54) SENSOR DATA PIPELINING

(71) Applicant: Intel IP Corporation, Santa Clara, CA (US)

(72) Inventors: Elad Levy, Rishon Le Zion (IL); Michael Glik, Kfar-Saba (IL); Miron Maevsky, Tel Aviv (IL); Bahareh Sadeghi, Portland, OR (US); Rafal Wielicki, Gdansk (PL); Avishai Ziv, Gedera (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/193,501

(22) Filed: Nov. 16, 2018

(65) Prior Publication Data

US 2019/0155769 A1    May 23, 2019

Related U.S. Application Data

(60) Provisional application No. 62/588,105, filed on Nov. 17, 2017.

(51) Int. Cl.
| | |
|---|---|
| *G06F 13/20* | (2006.01) |
| *G06F 13/42* | (2006.01) |
| *H04B 7/00* | (2006.01) |
| *H04B 7/06* | (2006.01) |
| *H04B 7/0413* | (2017.01) |
| *H04W 84/12* | (2009.01) |

(52) U.S. Cl.
CPC .......... *G06F 13/20* (2013.01); *G06F 13/4282* (2013.01); *H04B 7/00* (2013.01); *G06F 2213/0042* (2013.01); *H04B 7/0413* (2013.01); *H04B 7/0617* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2015/0134864 A1* | 5/2015 | Foster | G06F 1/12 710/106 |
| 2018/0143932 A1* | 5/2018 | Lawless | G06F 13/4282 |
| 2018/0225230 A1* | 8/2018 | Litichever | G06F 21/56 |

* cited by examiner

*Primary Examiner* — Henry Tsai
*Assistant Examiner* — Aurangzeb Hassan
(74) *Attorney, Agent, or Firm* — Eversheds Sutherland (US) LLP

(57) ABSTRACT

This disclosure describes systems, methods, and devices related to sensor data pipelining. A device may identify a first request of one or more requests received from a wireless universal serial bus (USB) host, wherein the first request is to collect data from a USB sensor. The device cause to send the first request to the USB sensor. The device identify a first response from the USB sensor, wherein the first response comprises data collected by the USB sensor based on the first request. The device determine that no additional requests are received from the wireless USB host. The device cause to send a second autonomous request to the USB sensor to collect data. The device identify a second response received from the USB sensor, wherein the second response is associated with the autonomous second request. The device cause to buffer or send the second response to the wireless USB host based on a second request being received from the wireless USB host.

14 Claims, 7 Drawing Sheets

SENSOR DATA PIPELINING

CROSS-REFERENCE TO RELATED APPLICATION(S)

This application claims the benefit of U.S. Provisional Application No. 62/588,105, filed Nov. 17, 2017, the disclosure of which is incorporated herein by reference as if set forth in full.

TECHNICAL FIELD

This disclosure generally relates to systems and methods for wireless communications and, more particularly, to sensor data pipelining.

BACKGROUND

Wireless universal serial bus (USB) devices use USB communications for wireless devices without actually needing a USB port or physical connection. This enables wireless gigabit transfer rates using existing USB infrastructure, for example. Wireless USB devices may communicate with each other using directional transmission techniques, including but not limited to beamforming techniques. Wireless devices may communicate over a next generation 60 GHz (NG60) network, an enhanced directional multi-gigabit (EDMG) network, and/or any other network.

DETAILED DESCRIPTION

Figure 1:
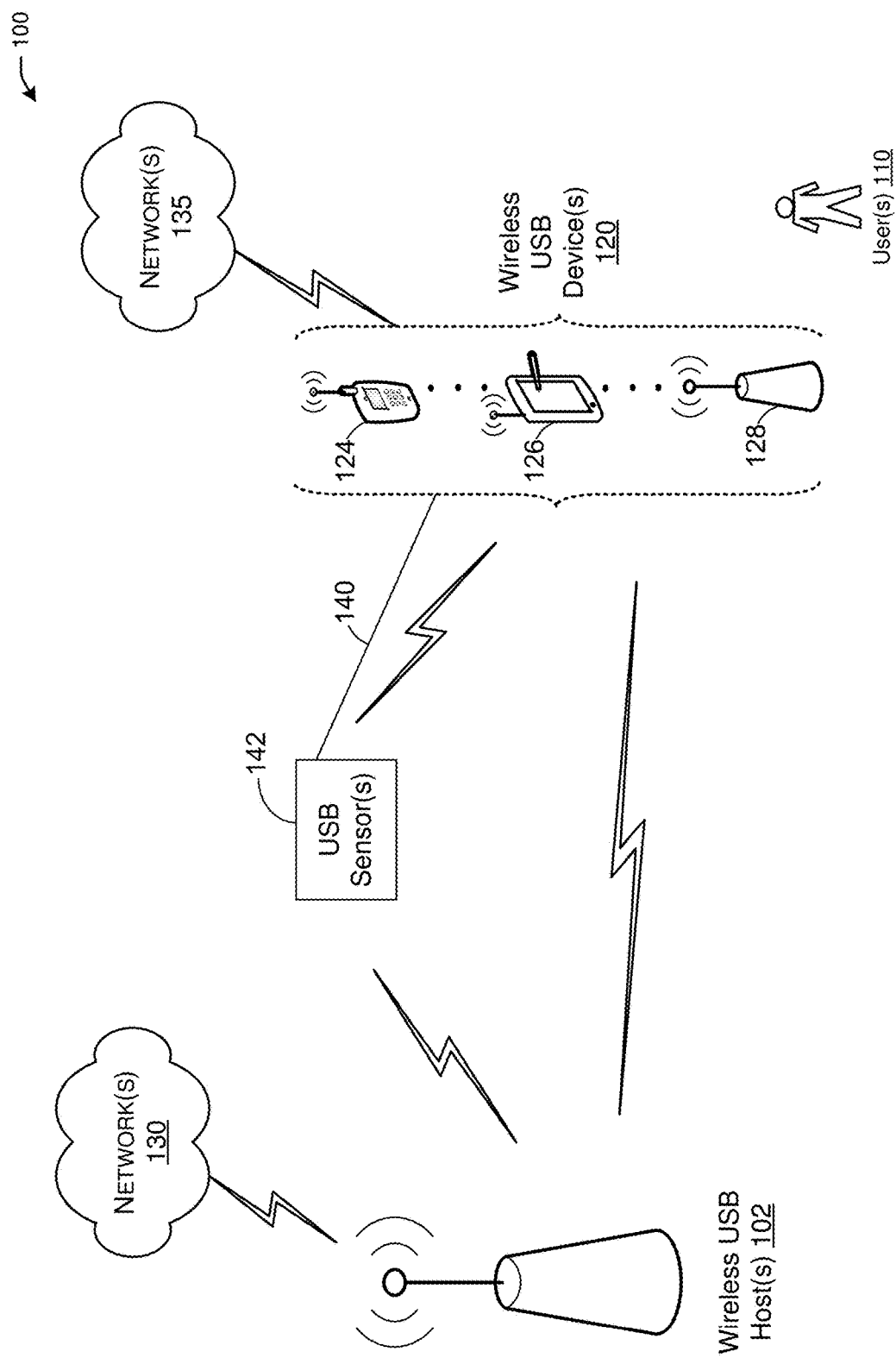
FIG. 1 depicts a network diagram illustrating an example network environment for sensor data pipelining over wireless universal serial bus (USB) links, in accordance with one or more example embodiments of the present disclosure.

Example embodiments described herein provide certain systems, methods, and devices for sensor data pipelining.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Several universal serial bus (USB) sensors generate periodic traffic with very high cadence (once per 1 milliseconds (ms) or even quicker) towards the USB host controller (IN direction). One example is virtual reality (VR) implementations which include various position and motion detection sensors in order to tightly track human activity and respond with update displayed content.

Operating over wired USB with short round trip delay time (e.g. from device sending a sensor data until its class driver submits another request for data), the current device drivers can consume continued sensor data even when utilizing only few parallel requests. For example, human interface device (HID) class driver uses just 2 parallel requests (1 request pending for device response while the other request is sent to the class driver).

Media Agnostic USB (MAUSB) Protocol Adaptation Layer (PAL) is the technology that enables transport of USB data over media other than USB cable, for example, wireless links—Wi-Fi or WiGig links, or wired links like Ethernet. In case of wireless links, MAUSB PAL may interface directly with the radio, for example, replace the network layer in OSI model or be an IP application, interfacing with the IP (TCP/IP) stacks. Similar to wired USB, in MAUSB, there exist four USB traffic types that are assigned priorities of processing by core USB specification, for example. The first type is non-periodic Control (CTRL), the second type is periodic Isochronous (ISOCH), the third type is periodic Interrupt (INTR), and the fourth type is non-periodic Bulk (BULK).

The MAUSB specification is designed to enable devices to achieve wireless gigabit transfer rates while leveraging existing USB infrastructure. The specification allows wireless devices and docking stations to communicate over the USB protocol, without the need for a physical USB connection. MAUSB supports multiple media types, including Wi-Fi® operating in 2.4 and 5 Ghz; WiGig operating in 60 Ghz; Ethernet; WiMedia UWB radios operating between 3.1-10.6 Ghz, and other existing or new wired or wireless media types that want to use the USB protocol.

When using MAUSB data transfer, data may be divided into (IN) and the data (OUT) data, wherein the data sent to the device is referred to as the OUT data from the host and by the host device data acquired from the application called the IN data. That is, data can be classified as OUT data when the data travels in the host-to-device direction, and IN data when the data travels in the device-to-host direction.

When operating over MAUSB links with larger round trip latency, using the same class/device driver configuration, there are potential gaps in consuming sensor data, meaning time periods where there is no pending request to poll data from the sensor at the desired time. The request arrives at a later time creating additional latency over the consumed data (e.g., when such sensor data reaches the class driver it is less updated). For some sensors designed with minimum memory, late polling will cause the sensor to drop data. Additional latency over the consumed data or data loss will degrade the overall system performance (for example wrong estimation of position for VR systems).

Before implementing the suggested solutions, systems were performing with given latencies leading to lower rate of consumed sensor data (e.g., sensor capable of producing 1000 samples per second was producing only few hundreds of samples) meaning consumed data was not as current as consumed data over wired systems. This leads to estimation errors when using this sensor data. For VR systems this leads to errors in position/movement estimations and causes errors in displayed VR content.

Example embodiments of the present disclosure relate to systems, methods, and devices for sensor data pipelining.

In one embodiment, a sensor data pipelining system may facilitate a solution based on "pipelining" of additional requests to cover for the time gaps where there are no pending requests towards the USB sensor. Two solutions may be presented: (1) a device based pipelining, and (2) a host based pipelining.

In the device based pipelining, there may be generating the additional requests within the MAUSB device/hub whenever there is no request pending at the USB device. MAUSB host will be capable of receiving responses without generating the matching requests. Such mechanism will be controlled using a new MAUSB protocol enhancement.

In the host based pipelining, there may be generating the additional requests within the MAUSB host in advance to cover for predicated gaps in servicing the USB sensor (according to the estimated round trip latency). Such solution is potentially less robust to jitters in the MAUSB link latency but requires no MAUSB protocol change (MAUSB device/hub behaves as today).

It should be understood that the sensor data pipelining system may be used over Interrupt, Bulk or even Isoch endpoints.

In one embodiment, the sensor data pipelining system may provide close to wired USB experience for such sensors even though the MAUSB link suffers from much larger latency compared to wired USB.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment for sensor data pipelining, in accordance with one or more example embodiments of the present disclosure. Wireless network 100 may include one or more user device(s) 120 and one or more wireless USB hosts 102, which may communicate in accordance with IEEE 802.11 communication standards, including Wireless Gigabit (Wi-Gig). WiGig offers short-range multi-gigabit connections for applications ranging from high-definition WiGig Display Extensions (WDE), to peripheral connectivity and I/O cable replacement such as WiGig Serial Extension (WSE), WiGig Bus Extension (WBE) and WiGig SDIO Extension (WDS). The user device(s) 120 may be referred to as stations (STAs). The user device(s) 120 may be mobile devices that are non-stationary and do not have fixed locations. The user devices 120 and the wireless USB host 102 may communicate using any wireless protocol that could be used between one or more USB devices, for example, an MAUSB protocol may be used, in accordance with one or more example embodiments of the present disclosure.

Although the wireless USB host 102 is shown to be communicating on multiple antennas with user devices 120, it should be understood that this is only for illustrative purposes and that any user device 120 may also communicate using multiple antennas with other user devices 120 and/or wireless USB host 102.

Figure 5:
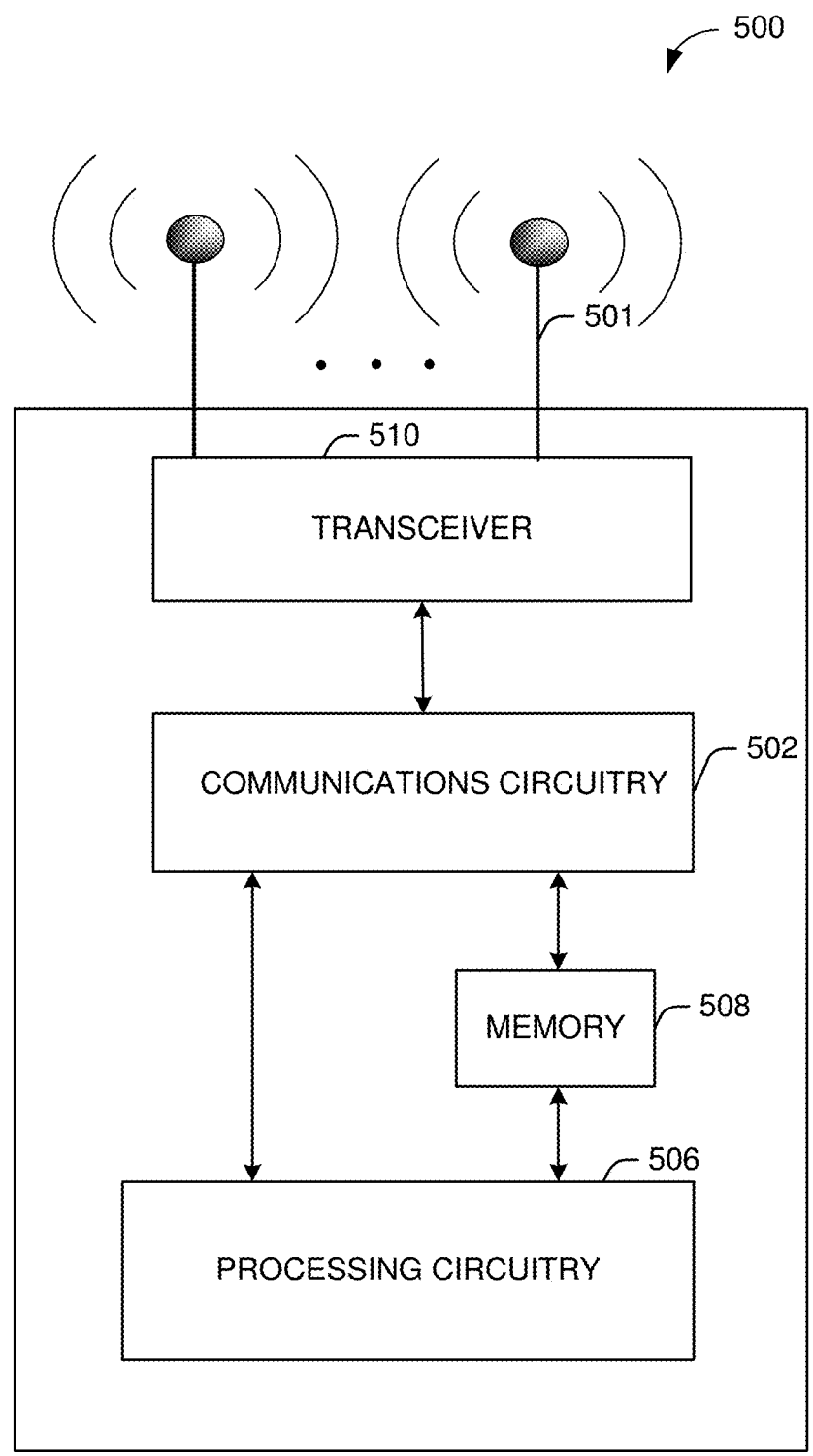
FIG. 5 illustrates a functional diagram of an example communication station that may be suitable for use as a user device, in accordance with one or more example embodiments of the present disclosure.
Figure 6:
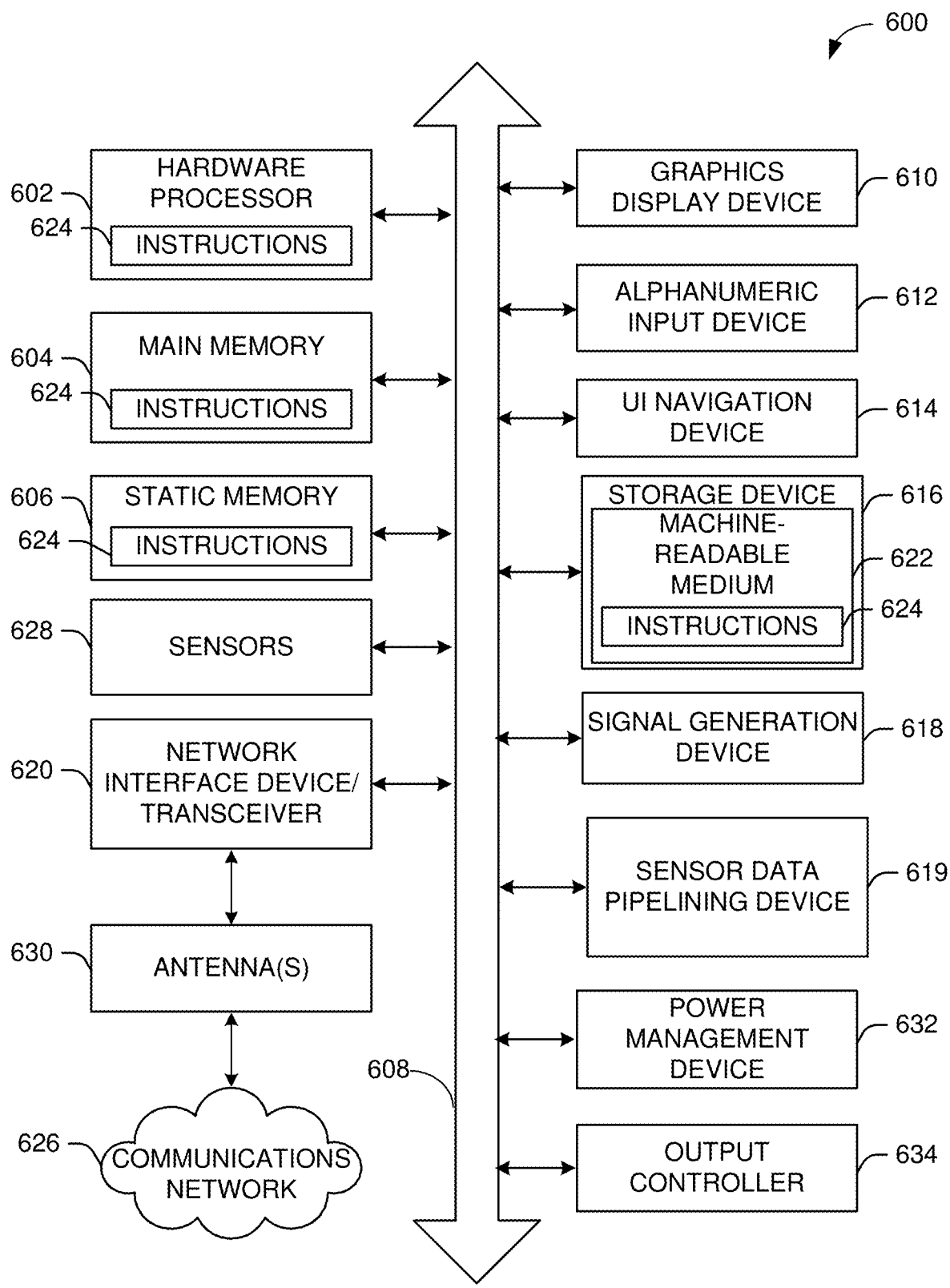
FIG. 6 illustrates a block diagram of an example machine upon which any of one or more techniques (e.g., methods) may be performed, in accordance with one or more example embodiments of the present disclosure.

In some embodiments, the user device(s) 120 and the wireless USB host 102 may include one or more computer systems similar to that of the functional diagram of FIG. 5 and/or the example machine/system of FIG. 6.

One or more illustrative user device(s) 120 and/or wireless USB host 102 may be operable by one or more user(s) 110. The user device(s) 120 (e.g., 124, 126, or 128) and/or wireless USB host 102 may include any suitable processor-driven device including, but not limited to, a mobile device or a non-mobile, e.g., a static, device. For example, user device(s) 120 and/or wireless USB host 102 may include, a user equipment (UE), a USB device, a station (STA), an access point (wireless USB host), a virtual reality (VR) device, an augmented reality (AR) device, a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Any of the user device(s) 120 (e.g., user devices 124, 126, 128), and wireless USB host 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, USB protocols, cable networks, public networks (e.g., the Internet), private networks, wireless networks, cellular networks, or any other suitable private and/or public networks.

Any of the user device(s) 120 (e.g., user devices 124, 126, 128), and wireless USB host 102 may be configured to communicate using a data stream including USB data over a wireless communication link according to a MAUSB protocol. However, other embodiments may be implemented with respect to communicating any other suitable data over any other communication link, according to any other communication protocol and/or over any other layer. In one or more example embodiments, wireless USB host 102 may perform the functionality of a USB host and the one or more user device(s) 120 may perform the functionality of a USB device.

Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

The phrases "MAUSB device", as used herein, may include, for example, a MAUSB architectural element that integrates, and/or is associated with, at least one device, e.g., a USB device, and manages transfers, e.g., USB transfers, targeting the integrated device over a network connection. In one example, the integrated device may be connected, for example, through a wired USB, e.g., USB cable, USB chip-to-chip interconnect, and/any other technologies. For example, the integrated device may be presented through the MAUSB device to a host as a USB device compliant with a USB specification, e.g., the USB 2.0, USB 3.0, USB 3.1 specification, or future versions thereof.

In one example, the MAUSB device may optionally include any computing platform, e.g., a portable device, which houses and/or performs the functionality of the MAUSB device and, optionally, one or more additional elements, e.g., drivers and/or application software, configured to perform the functionality of a peripheral device. In other embodiments, the MAUSB device may include and/or may be implemented by any other portable or non-portable device.

In one or more example embodiments, the MAUSB device may include USB device logic, e.g., for communicating with a USB device according to a USB Specification, a MAUSB device PAL, e.g., to control communication over the PAL, and a network interface, e.g., to communicate over the communication link. For example, the MAUSB device PAL may interface between the USB device logic and the network interface, e.g., in a transparent manner. In other embodiments, the MAUSB device may include any other elements. In one example, the PAL communication unit may perform the functionality of at least the MAUSB device PAL.

The phrases "MAUSB host," as used herein, may include an architectural element of the MAUSB PAL that includes a communication architecture, e.g., a WiGig or WiFi MAC and PHY, and USB host logic, e.g., as defined by a USB specification, e.g., the USB 2.0, USB 3.0, or USB 3.1 specification or future versions thereof.

In one example, the MAUSB host may optionally include any computing platform, e.g., a personal computer, which houses and/or performs the functionality of the MAUSB host and, optionally, one or more additional elements, e.g., drivers and/or application software, configured to perform the functionality of a host device. In other embodiments, the MAUSB host may include and/or may be implemented by any other portable or non-portable device.

In one or more example embodiments, the MAUSB host may include USB host logic, e.g., for communicating with a USB host according to a USB Specification, a MAUSB host PAL, e.g., to control communication over the PAL, and a network interface, e.g., to communicate over the communication link. For example, the MAUSB host PAL may interface between the USB host logic and the network interface, e.g., in a transparent manner. In other embodiments, the MAUSB host may include any other elements. In one example, the PAL communication unit may perform the functionality of at least the MAUSB host PAL.

An endpoint may include, for example, an architectural element, which is associated with a first device, which in turn is configured to interface between the endpoint and a second device over a communication link. For example, the endpoint may be integrated as part of the first device or connected to the first device via one or more other devices and/or connections. The endpoint may be implemented, for example, using any technology, e.g., software, hardware and/or any combination thereof. The first device may include and/or interface between one or more endpoints and the second device.

In one example, the first device may include a MAUSB device and the second device may include a MAUSB host. For example, the endpoint may belong to a USB device, e.g., a USB device, which may be integrated into the MAUSB device or connected, e.g., through a wired USB connection, to the MAUSB device, e.g., via a hub integrated into the MAUSB device. According to this example, the endpoint may be uniquely identified by the MAUSB host. For example, a combination of a MAUSB device address of the MAUSB device and a MAUSB EP handle assigned to the endpoint may uniquely identify a USB device endpoint within a MAUSB service set.

In other examples, the first and second devices may include any other, e.g., non-MAUSB, non-WSE and/or non-USB, device and the endpoint may perform the functionality of any other, e.g., non-USB, non-MAUSB and/or non-WSE, element.

Any of the user device(s) 120 (e.g., user devices 124, 126, 128), and wireless USB host 102 may include one or more communications antennas. The one or more communications antennas may be any suitable type of antennas corresponding to the communications protocols used by the user device(s) 120 (e.g., user devices 124, 126 and 128), and wireless USB host 102. Some non-limiting examples of suitable communications antennas include, MAUSB antennas Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the user devices 120 and/or wireless USB host 102.

Any of the user devices 120 (e.g., user devices 124, 126, 128), and wireless USB host 102 may include multiple antennas that may include one or more directional antennas. The one or more directional antennas may be steered to a plurality of beam directions. For example, at least one antenna of a user device 120 (or a wireless USB host 102) may be steered to a plurality of beam directions. For example, a user device 120 (or a wireless USB host 102) may transmit a directional transmission to another user device 120 (or another wireless USB host 102).

Any of the user device(s) 120 (e.g., user devices 124, 126, 128), and wireless USB host 102 may be configured to perform directional transmission and/or directional reception in conjunction with wirelessly communicating in a wireless network. Any of the user device(s) 120 (e.g., user devices 124, 126, 128), and wireless USB host 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and wireless USB host 102 may be configured to perform any given directional transmission towards one or more defined transmit sectors. Any of the user device(s) 120 (e.g., user devices 124, 126, 128), and wireless USB host 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or wireless USB host 102 may be configured to use all or a subset of its one or more communications antennas to perform MIMO beamforming.

Any of the user devices 120 (e.g., user devices 124, 126, 128), and wireless USB host 102 may include any suitable radio and/or transceiver for transmitting and/or receiving radio frequency (RF) signals in the bandwidth and/or channels corresponding to the communications protocols utilized by any of the user device(s) 120 and wireless USB host 102 to communicate with each other. The radio components may include hardware and/or software to modulate and/or demodulate communications signals according to pre-established transmission protocols. In one or more example embodiments, the radios may include one or more wireless transmitters, receivers and/or transceivers able to send and/or receive wireless communication signals, RF signals, frames, blocks, transmission streams, packets, messages, data items, and/or data. For example, the radios may include or may be implemented as part of a wireless Network Interface Card (NIC), and the like.

Some demonstrative embodiments may be used in conjunction with a wireless communication network communicating over a frequency band of 60 GHz. However, other embodiments may be implemented utilizing any other suitable wireless communication frequency bands, for example, an extremely high frequency (EHF) band (the millimeter wave (mmWave) frequency band), a frequency band within the frequency band of between 20 GHz and 300 GHz, a WLAN frequency band, a WPAN frequency band, a frequency band according to the WGA specification, and the like.

The phrases "directional multi-gigabit (DMG)" and "directional band (DBand)", as used herein, may relate to a frequency band wherein the channel starting frequency is above 45 GHz. In one example, DMG communications may involve one or more directional links to communicate at a rate of multiple gigabits per second, for example, at least 1 gigabit per second, 7 gigabits per second, or any other rate.

In some demonstrative embodiments, the user device(s) 120 and/or the wireless USB host 102 may be configured to operate in accordance with one or more specifications, including one or more IEEE 802.11 specifications, (e.g., an IEEE 802.11ad specification, an IEEE 802.11ay specification, and/or any other specification and/or protocol). For example, an amendment to a DMG operation in the 60 GHz band, according to an IEEE 802.11ad standard, may be defined, for example, by an IEEE 802.11ay project.

In one embodiment, and with reference to FIG. 1, a wireless USB host (e.g., wireless USB host 102) establishes communication with one or more user devices 120 (e.g., user devices 124, 126, and/or 128) and one or more USB sensor(s) 142. The wireless USB host 102, the user devices 120, and the USB sensor(s) 142 may communicate with each other through a wired or wireless manner. For example, the one or more USB sensor(s) 142 may be wired to the wireless USB devices 120, for example, through wired connection 140 or may be wirelessly wired together. The wireless USB host 102 may send and receive frames and messages (e.g., request messages for sensor data and related response messages.

The one or more USB sensors 142 may generate periodic traffic with very high cadence (once per 1 milliseconds (ms) or even quicker) towards the wireless USB host 102 (IN direction). One example is virtual reality (VR) implementations which include various position and motion detection sensors in order to tightly track human activity and respond with update displayed content.

Figure 2:
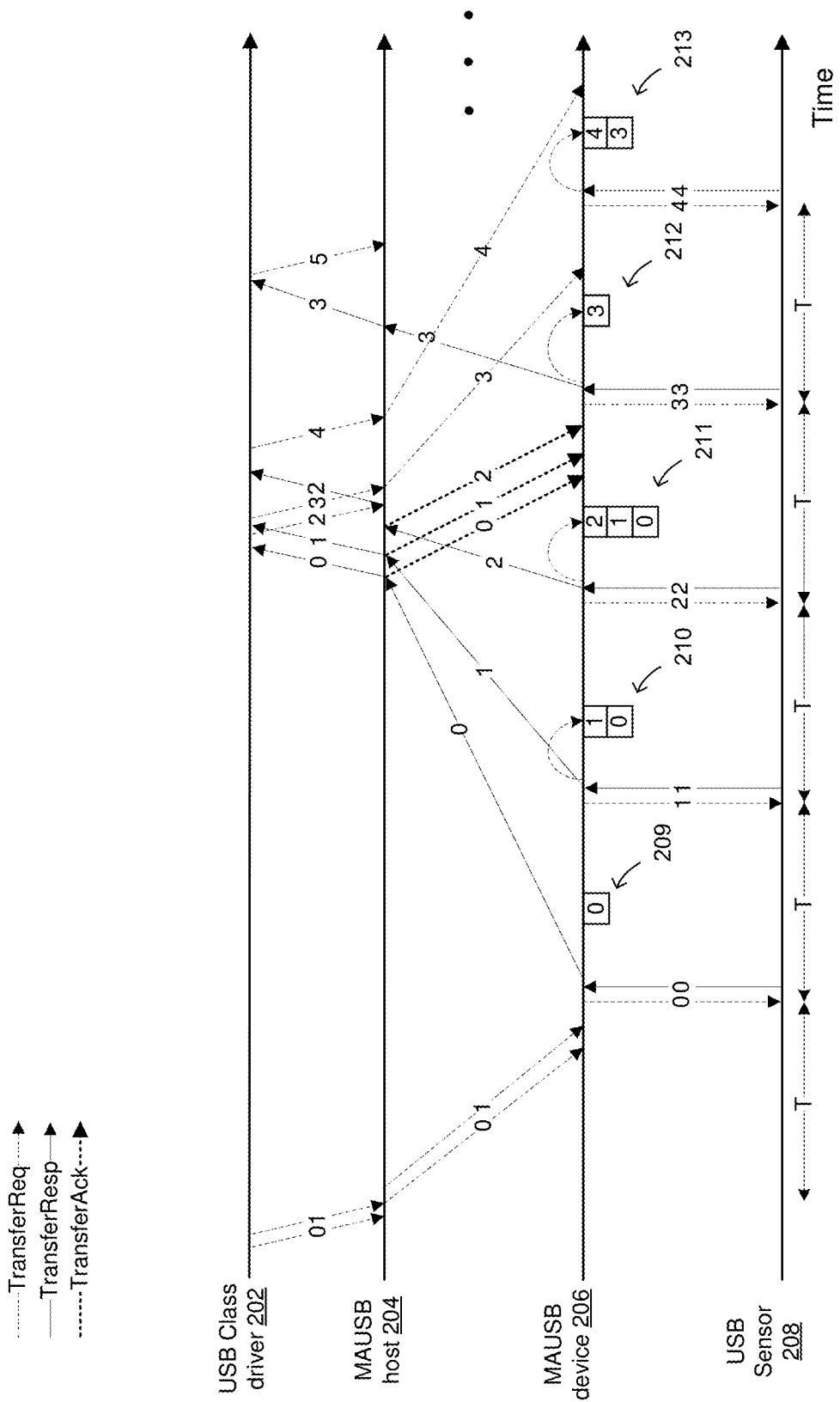
FIG. 2 depicts an illustrative schematic diagram for sensor data pipelining, in accordance with one or more example embodiments of the present disclosure.

FIG. 2 depicts an illustrative schematic diagram for sensor data pipelining, in accordance with one or more example embodiments of the present disclosure.

Referring to FIG. 2, there is shown a wireless USB device (e.g., an MAUSB device 206), a wireless USB host (e.g., an MAUSB host 204), a USB sensor 208 and a USB class driver 202. It should be understood that although the example shows MAUSB devices, other wireless USB devices may be used in accordance to one or more wireless protocols that may be applicable to USB devices. Also, it should be understood that the USB class driver 202 and the MAUSB host 204 may be in close proximity to each other but in separate devices or may be housed in the same device. Further, the USB class driver 202 and the MAUSB host 204 may be connected in a wired fashion, such that delays in sending and receiving messages between the USB class driver 202 and the MAUSB host 204 are very minimal. Similarly, the MAUSB device 206 and USB sensor 208 may be in close proximity to each other but in separate devices or may be housed in the same device. Further, the USB sensor 208 and the MAUSB device 206 may be connected in a wired fashion, such that delays in sending and receiving messages between the USB sensor 208 and the MAUSB device 206 are very minimal.

Referring to FIG. 2, there is shown a solution based on new MAUSB pipelining capability over bulk/interrupt IN endpoint. MAUSB device/hub may declare the new capability within its capability response message using the below capability descriptor in Table 1.

TABLE 1

IN Pipelining Capabilities descriptor

| Width (bits) | Offset (DW:bit) | Description |
| --- | --- | --- |
| 8 | N:n | Length. Indicates the length of the descriptor in bytes. Set to 3. |
| 8 | N:n + 8 | MA Device Capability Type = IN pipelining Capability. |
| 8 | N:n + 16 | IN pipelining Capability Bitmap = 0x01 to indicate MAUSB device supports the IN pipelining capability. 0x00 to indicate no support. |

In one embodiment, if supported by MAUSB device/hub, MAUSB host may be allowed to enable the pipelining operation by sending ConfigureEpPipelining packet (new management packet) containing the below fields in Table 2.

TABLE 2

ConfigureEpPipelining packet:

| Width (bits) | Offset (DW:bit) | Description |
|---|---|---|
| 16 | N:0 | Endpoint (EP) Handle. Identification of the Endpoint. |
| 1 | N:16 | Enable pipelining - 0x1 to enable, 0x0 to disable |
| 7 | N:17 | Pipelining depth - the amount of requests MAUSB device is allowed to generate beyond the last request received by MAUSB host. 0x00 signals no limit. |
| 48 | N:24 | Request size - in bytes |

In one embodiment, an alternative option to enable the pipelining feature may be to include the same fields in EpHandleReq packet.

In one embodiment, for endpoints with enabled "pipelining", MAUSB device 206 may be allowed to generate one or more "autonomous requests," when there are no pending requests submitted to the MAUSB device 206. The autonomous requests may be auto generated to replace the actual requests (e.g., TransferReqs) that may be arriving at a later time due to delays. The number of autonomous requests generated without TransferReq received and their size is limited by MAUSB host 204 instruction in ConfigureEpPipelining packet in the EpHandleReq field of Table 2.

In one embodiment, when an MAUSB device 206 responds using an autonomous request, the MAUSB device 206 will generate TransferResp with incremented request ID (reqID) and serial number (SN) (compared to previously receive TransferReq). This is basically an "implied TransferReq" mode. The MAUSB device 206 may be responsible for managing retries over this TransferResp until TransferAck is received from MAUSB host.

In one embodiment, the MAUSB host 204 receiving TransferResp for autonomous request (recognized by ReqID not yet allocated by MAUSB host 204) it may queue it and wait for a matching request from upper layers before forwarding the payload to upper layer.

When the matching request arrives from upper layer, MAUSB host 204 may forward the payload to upper layer and will generate a TransferReq for it turning the request from "autonomous" to "regular" request. From this point, it may be treated with same rules of regular request (e.g. usage of TransferAck, timeouts, retries, etc.). After fully processing the TransferResp, MAUSB host 204 may also send TransferAck like in processing of regular transfer.

In one embodiment, another option for MAUSB host 204 behavior in this case may be skipping the TransferReq, sending just TransferAck to MAUSB device 206 and marking this transfer as completed.

In one embodiment, MAUSB device 206 receiving TransferReq for "autonomous request" may mark the request as regular (with all transfer rules) and may not count it in the number of autonomous requests from that point. This MAUSB device 206 behavior applies whether the autonomous request was already complete by the MAUSB device 206 (and TransferResp sent) or not (and TransferResp was not generated yet).

The following additional protocol rules may apply:
The MAUSB device 206 receiving TransferAck on autonomous request can clear this transfer (skipped/lost TransferReq case) from its buffer or queue.

In one embodiment, a request to clear all transfers from upper layer will clear the MAUSB host 204 queued TransferResp packets. MAUSB device 206 receiving a ClearTransfers request shall clear all autonomous requests and shall roll back the reqID allocated for those requests.

In one embodiment, MAUSB device 206 receiving a CancelReq for autonomous request may also turn this request to regular request and treat it as defined in MAUSB specification for regular requests.

In one embodiment, MAUSB-reset or link loss or disconnect will clear all queues.

FIG. 2 presents typical pipelining operation, where the autonomously generated requests are shown. Two cases are shown—buffered TransferResp (transfer #2) and transfer that was autonomously generated but not buffered once arriving MAUSB host 204 (transfer #3). The feature can be enabled also using MAUSB vendor specific messages (instead of declared capability and enabling in EpHandleReq message) or enabled by default without such explicit enabling. Also for such implementations the MAUSB device 206 will generate TransferResp packet with sensor data and request-ID that was not previously allocated and requested in TransferReq packet. For example, the USB class driver 202 may send requests 0 and 1 to the MAUSB host 204. The MAUSB host 204 may then forward these requests to the MAUSB device 206. The MAUSB device 206 may send request 0 to the USB sensor 208. The USB sensor 208 may then respond to that request by sending response 0 (e.g., TransferResp) to the MAUSB device 206, which then forwards the response 0 to the MAUSB host 204, which then forwards the response 0 to the USB class driver 202. Similarly, the MAUSB device 206 may send request 1 to the USB sensor 208. The USB sensor 208 may then respond to that request by sending Response 1 to the MAUSB device 206, which then forwards the response 1 to the MAUSB host 204, which then forwards the response 1 to the USB class driver 202. Upon completion of the request 1 by the USB sensor 208 and after it has been received by the MAUSB device 206, the MAUSB device 206 checks if there are any one or more requests, that may have been stored in a request queue (not shown in FIG. 2). If no such new request(s), the MAUSB device 206 may create another request (e.g., autonomous request 2) to be sent to the USB sensor 208. It is shown that a queue 209 contains information associated with the response 0 after the response 0 is sent from the MAUSB device 206 to the MAUSB host 204. This information is kept in the queue in order to resend if no acknowledgment is received from the MAUSB host 204. It should be understood that the queue 210 still contains information related to responses 0 and 1 because the MAUSB device 206 is still waiting for the acknowledgments from the MAUSB host 204 before it can clear the queue 210 from these responses. The reason the responses 0 and 1 stay in the queue 210 is in case for some reason an acknowledgment was never received, the MAUSB device 206 may resend responses 0 and/or 1. The MAUSB device 206 may then send the autonomous request 2 to the USB sensor 208. The USB sensor 208 may then respond to that autonomous request 2 by sending a response 2 to the MAUSB device 206, where the response 2 is also put in the queue 211. The MAUSB device 206 may send the completed data without waiting for the actual request 2 (e.g., TransferReq (own allocated ReqID). That is, the MAUSB device 206 may use the data collected for the autonomous request 2 to send to the MAUSB host 204 even without receiving the actual request 2. At this point, the MAUSB host 204 may buffer the response 2 received from the MAUSB device 206 for the autonomous request 2 until the actual request 2 (e.g., matching request) arrives from the USB class driver 202.

Upon completion of the request 2 by the USB sensor 208 and after it has been received by the MAUSB device 206, the MAUSB device 206 checks if there are any one or more requests, that may have been stored in a request queue (not shown in FIG. 2). If no such new request(s), the MAUSB device 206 may create another request (e.g., autonomous request 3) to be sent to the USB sensor 208 to collect data. The USB sensor 208 may then respond to the autonomous request 3 with a response 3 which may then be received by the MAUSB device 206. At this point queue 211 contains responses 0, 1, and 2. The queue 211 will continue to keep these responses until acknowledgments (e.g., transferAck) associated with each of the actual requests are received the from the MAUSB host 204.

FIG. 2 shows that acknowledgments 0, 1, and 2, are sent from the MAUSB host 204 to the MAUSB device 206 after the MAUSB host 204 has received responses 0, 1, and 2, respectively. In that case, the MAUSB host 204 can send an acknowledgments 0, 1, and 2 (e.g., transferAcks) associated with the actual requests 0, 1, and 2 to the MAUSB device 206. The acknowledgment results in the information associated with the responses 0, 1, and 2 to be removed from the queue 212. Similar to the autonomous request 2, if the queue or buffer (e.g., queue 211) towards the MAUSB device 206 is empty, the MAUSB device 206 may create another request (e.g., autonomous request 3). Then the MAUSB device 206 may send an autonomous request 3 to the USB sensor 208. The USB sensor 208 may then respond to that autonomous request 3 by sending data to the MAUSB device 206. Then the MAUSB device 206 may autonomously generate a response 3 that gets sent to the MAUSB host 204, which arrives at the MAUSB host 204 after the matching transferReq is already sent, therefore, there is no need to buffer the response 3 at the MAUSB host 204, as was done for the response associated with the autonomous request 2. However, the MAUSB device 206 buffers the response 3 until it receives the actual request 3 from the MAUSB host 204. The response 3 is shown to be buffered in queue 212. It should be noted that responses 0, 1, 2 are not in queue 212. That is because as shown in FIG. 2, and acknowledgment for request 2 is received from the MAUSB host 204, and it is assumed, although not shown in FIG. 2 that acknowledgments to responses 0, and 1, has already been received by the MAUSB device 206 from the MAUSB host 204.

As shown in FIG. 2, request 3 is sent from the USB class driver 202 to the MAUSB host 204, which is then sent to the MAUSB device 206. After the MAUSB device 206 sends the response 3 to the MAUSB host 204, the MAUSB device 206 checks if a request 4 has been received from the MAUSB host 204. Since request 4 has not been received by the MAUSB device 206 the MAUSB device 206 may generate a request 4 to send to USB sensor 208. The USB sensor 208 may then respond by sending a response 4 to the MAUSB device 206. The response 4 is then buffered in queue 213 (in addition to response 3 because an acknowledgment to the response 3 has not been received from the MAUSB host 204). This may continue as requests come in.

It is understood that the above descriptions are for purposes of illustration and are not meant to be limiting.

Figure 3:
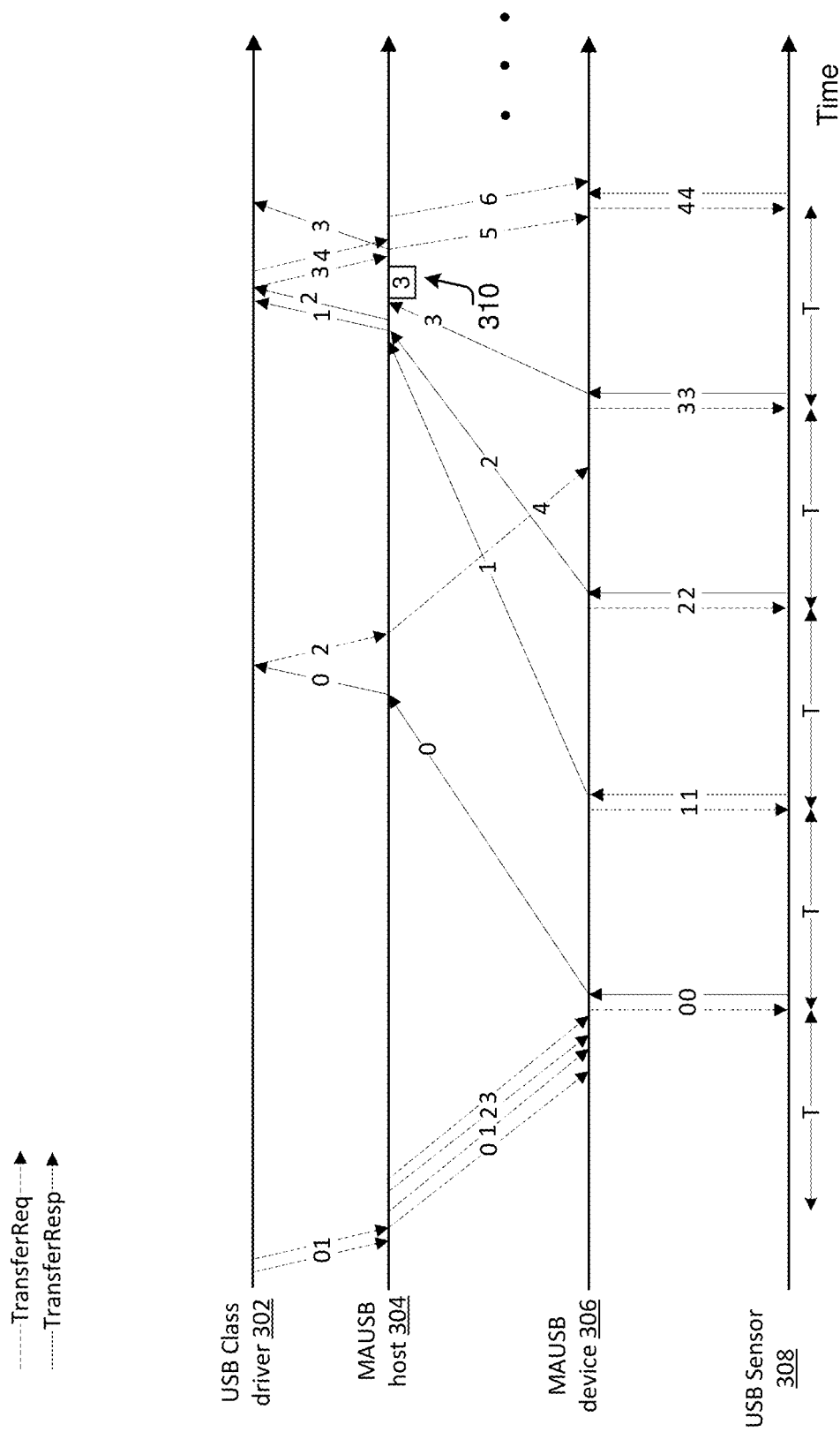
FIG. 3 depicts an illustrative schematic diagram for sensor data pipelining, in accordance with one or more example embodiments of the present disclosure.

FIG. 3 depicts an illustrative schematic diagram for sensor data pipelining, in accordance with one or more example embodiments of the present disclosure.

Referring to FIG. 3, there is shown a second solution which may be generating the autonomous requests at the MAUSB host implementation.

In FIG. 3, there is shown a wireless USB device (e.g., an MAUSB device 306), a wireless USB host (e.g., an MAUSB host 304), a USB sensor 308 and a USB class driver 302. It should be understood that although the example shows MAUSB devices, other wireless USB devices may be used in accordance to one or more wireless protocols that may be applicable to USB devices. Also, it should be understood that the USB class driver 302 and the MAUSB host 304 may be in close proximity to each other but in separate devices or may be housed in the same device. Further, the USB class driver 302 and the MAUSB host 304 may be connected in a wired fashion, such that delays in sending and receiving messages between the USB class driver 302 and the MAUSB host 304 are very minimal. Similarly, the MAUSB device 306 and USB sensor 308 may be in close proximity to each other but in separate devices or may be housed in the same device. Further, the USB sensor 308 and the MAUSB device 306 may be connected in a wired fashion, such that delays in sending and receiving messages between the USB sensor 308 and the MAUSB device 306 are very minimal.

In one embodiment, MAUSB host may decide, based on the endpoint parameter or prior knowledge of specific devices, to enable the pipelining feature (e.g., using the fields in Tables 1 and 2 above).

In one embodiment, once enabled, the MAUSB host 304 may produce additional IN requests on top of the IN requests received from the upper layer. Those additional requests shall comply with all MAUSB protocol rules (including incremented Req-ID and SN) and May appear to MAUSB device 306 as regular requests.

In one embodiment, once such request is served by the USB sensor 308 and the MAUSB device 306, and sensor data is delivered in TransferResp packets to the MAUSB host 304, the MAUSB host 304 may queue the data internally until the actual requests (e.g. matching requests) are received from upper layers (e.g., from USB class driver 302). Then, the MAUSB host 304 may immediately complete such requests with the queued data.

In one embodiment, in case the MAUSB host 304 generates an autonomous request, still has not got its response and at that point received the matching request from upper layer, it shall mark this request as regular (non-autonomous) and may keep waiting for its response from the MAUSB device 306. At any point, the MAUSB host 304 may decide to create more autonomous requests based on the currently existing autonomous requests or other criteria. In this case, the MAUSB host 304 may generate additional 2 requests over the requests from the class driver. The diagram shows different latency experienced by responses 1, 2, and 3. As a result, response 3 is buffered at MAUSB host 304 until the matching request arrives from class driver.

FIG. 3 presents typical pipelining operation, where the autonomously generated requests are shown.

For example, the USB class driver 302 may send requests 0 and 1 to the MAUSB host 304. The MAUSB host 304 may then forward these requests to the MAUSB device 306. However, the MAUSB host 304 may send additional requests (e.g., requests 2 and 3). It should be understood that the number of additional request may be determined by the performance of the wireless interface between the MAUSB host 304 and the MAUSB device 306. Based on the delays experienced between these two devices, e.g., using received signal strength indicator (RSSI) or signal to noise ratio (SNR), or other delay determination techniques, the MAUSB host 304 may determine to send an N number of additional requests, where N is a positive integer. In this example however there is shown that two additional autonomous requests are generated, e.g., request 2 and request 3, which are sent from the MAUSB host 304 to the MAUSB device 306 even though the actual requests 2 and 3 have not been received from the USB class driver 302. The four requests received at the MAUSB device 306 may then be sent to the USB sensor 308 at specific intervals (e.g., interval T). For example, interval T may be 1 ms. The MAUSB device 306 may send request 0 to the USB sensor 308, which would then respond with the response 0 sent to the MAUSB device 306. The MAUSB device 306 may then send that response 0 to the MAUSB host 304, which in turn will send that response 0 to the USB class driver 302. Similarly, The MAUSB device 306 may send request 1 to the USB sensor 308, which would then respond with the response 1 sent to the MAUSB device 306. The MAUSB device 306 may then send that response 1 to the MAUSB host 304, which in turn will send that response 1 to the USB class driver 302. FIG. 3 shows the delays in the communication between the MAUSB host 304 and the MAUSB device 306 because of the responses 0 and 1 are sent at varying times due to the wireless nature of the interface between the MAUSB host 304 and the MAUSB device 306. The same happens for request 2. When the actual request 2 is received from the USB class driver 302 at the MAUSB host 304, the MAUSB host 304 may generate a request 4 to send to the MAUSB device 306. Also, in this example is shown that when the MAUSB device 306 sent the request 3 to the USB sensor 308 and received the response 3 from the USB sensor 308, the MAUSB device 306 sent the response 3 to the MAUSB host 304. However, the response 3 is shown to be received at the MAUSB host 304 before receiving the actual request 3 from the USB class driver 302. In that case, if a response is received at the MAUSB host 304 before the actual corresponding request is received at the MAUSB host 304, the MAUSB host 304 may buffer the response 3 in queue 310. When the actual request 3 is received from the USB class driver 302 at the MAUSB host 304, the MAUSB host 304 may then send the response 3 found in the queue 310 to the USB class driver 302. The cycle continues as the MAUSB host 304 receives additional requests 3 and 4 from the USB class driver 302. The MAUSB host 304 made then generate requests 5 and 6 to send to the MAUSB device 306.

It is understood that the above descriptions are for purposes of illustration and are not meant to be limiting.

Figure 4A:
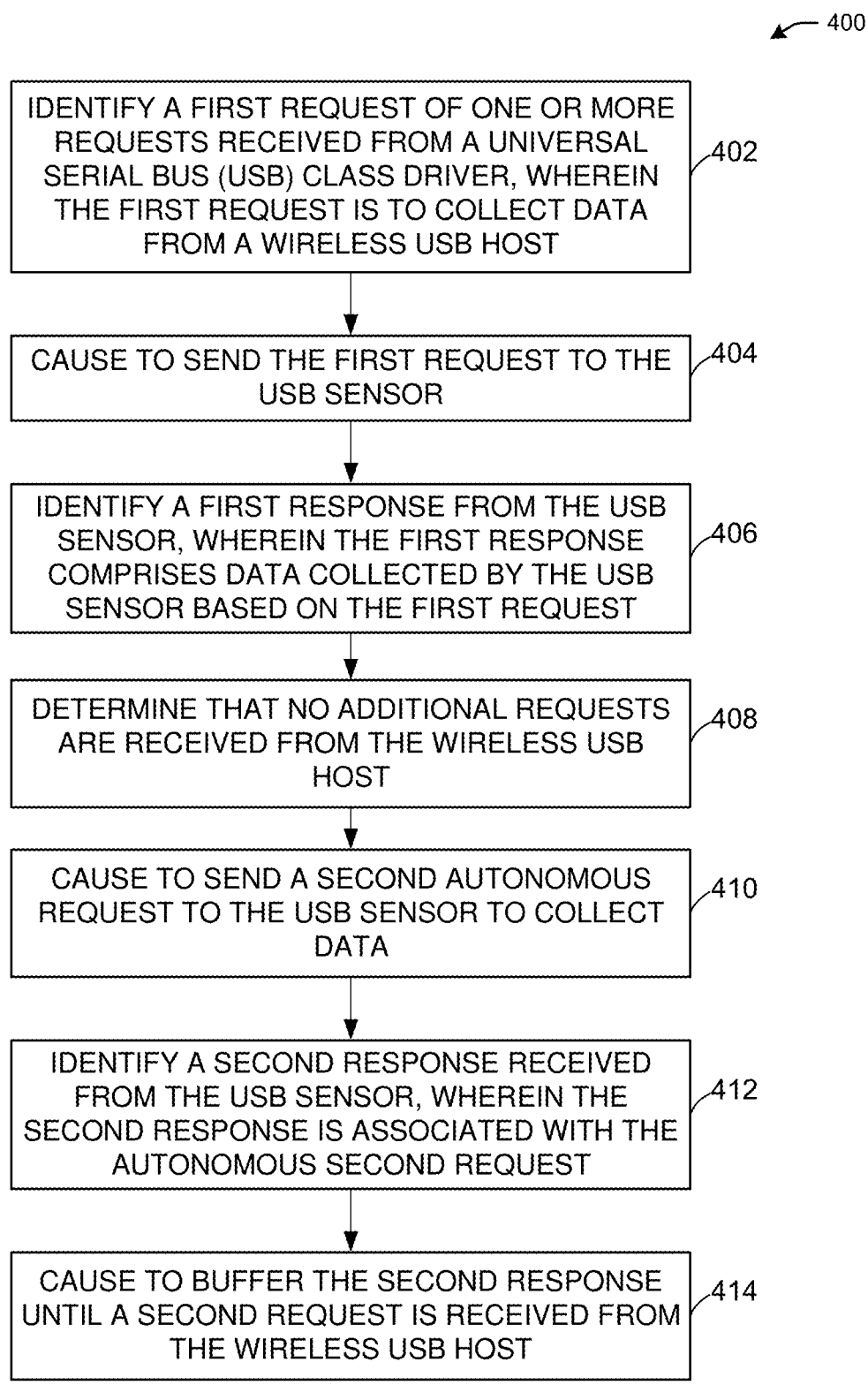
FIG. 4A illustrates a flow diagram of illustrative process for an illustrative sensor data pipelining system, in accordance with one or more example embodiments of the present disclosure.

FIG. 4 illustrates a flow diagram of illustrative process 400 for an illustrative sensor data pipelining system, in accordance with one or more example embodiments of the present disclosure.

At block 402, a device (e.g., the user device(s) 120 and/or the wireless USB host 102 of FIG. 1) may identify a first request of one or more requests received from a wireless universal serial bus (USB) host, wherein the first request is to collect data from a USB sensor.

At block 404, the device may cause to send the first request to the USB sensor.

At block 406, the device may identify a first response from the USB sensor, wherein the first response comprises data collected by the USB sensor based on the first request. The device may cause to send the first response to the wireless USB host wherein the first response is associated with the first request received from the wireless USB host. The wireless USB host may be a media agnostic universal serial bus (MAUSB) host. The device may identify a first acknowledgment received from the wireless USB host, wherein the first acknowledgment is to acknowledge the first response.

At block 408, the device may determine that no additional requests are received from the wireless USB host.

At block 410, the device may cause to send a second autonomous request to the USB sensor to collect data. The first request and the second autonomous request are sent to the USB sensor at a periodic interval.

At block 412, the device may identify a second response received from the USB sensor, wherein the second response is associated with the autonomous second request. The device may cause to send the second response to the wireless USB host after receiving the second request. The device may determine to remove the second response from the buffer after receiving a second acknowledgment associated with the second response At block 414, the device may cause to buffer or send the second response to the wireless USB host based on a second request being received from the wireless USB host.

It is understood that the above descriptions are for purposes of illustration and are not meant to be limiting.

Figure 4B:
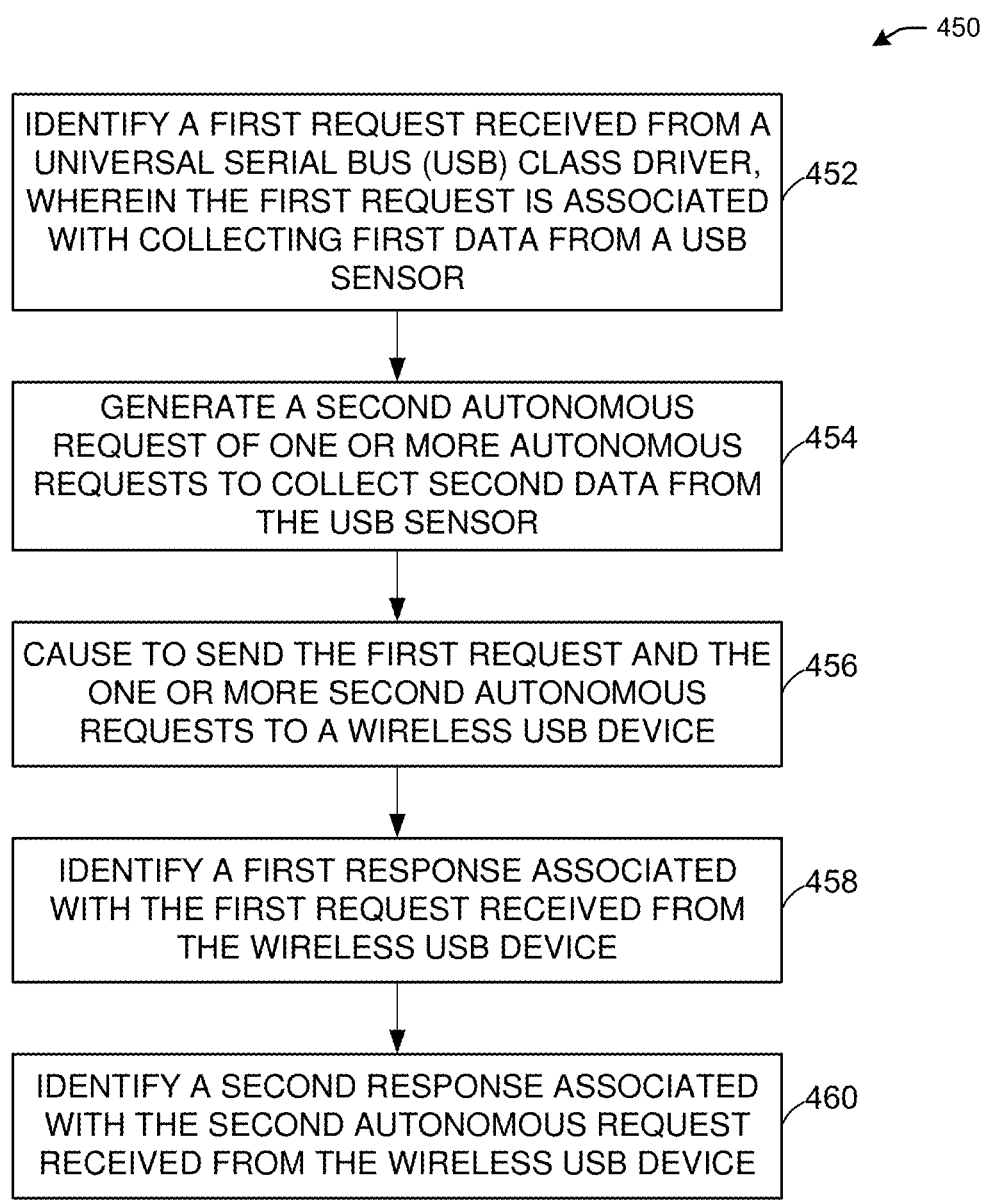
FIG. 4B illustrates a flow diagram of illustrative process for an illustrative sensor data pipelining system, in accordance with one or more example embodiments of the present disclosure.

FIG. 4B illustrates a flow diagram of illustrative process 450 for a high efficiency signal field coding system, in accordance with one or more example embodiments of the present disclosure.

At block 452, a device (e.g., the user device(s) 120 and/or the wireless USB host 102 of FIG. 1) may identify a first request received from a universal serial bus (USB) class driver, wherein the first request is associated with collecting first data from a USB sensor.

At block 454, the device may generate a second autonomous request of one or more autonomous requests to collect second data from the USB sensor.

At block 456, the device may cause to send the first request and the one or more second autonomous requests to a wireless USB device.

At block 458, the device may identify a first response associated with the first request received from the wireless USB device. For example, the first response may be received at a first time instance.

At block 460, the device may identify a second response associated with the second autonomous request received from the wireless USB device. For example, the second response is received at a second time instance. The device may buffer the second response until receiving the second request The device may identify a second request received from the USB class driver, wherein the second request is received at a third time instance. The third time instance associated with receiving the second request from the USB class driver may be greater than a time instance associated with receiving the second response.

FIG. 5 shows a functional diagram of an exemplary communication station 500 in accordance with some embodiments. In one embodiment, FIG. 5 illustrates a functional block diagram of a communication station that may be suitable for use as a wireless USB host 102 (FIG. 1) or user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The transceiver 510 may be a device comprising both a transmitter and a receiver that are combined and share common circuitry (e.g., communication circuitry 502). The communication circuitry 502 may include amplifiers, filters, mixers, analog to digital and/or digital to analog converters. The transceiver 510 may transmit and receive analog or digital signals. The transceiver 510 may allow reception of signals during transmission periods. This mode is known as full-duplex, and may require the transmitter and receiver to operate on different frequencies to minimize interference between the transmitted signal and the received signal. The transceiver 510 may operate in a half-duplex mode, where the transceiver 510 may transmit or receive signals in one direction at a time.

The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in detailed in FIGS. 1, 2, 3, 4A, and 4B.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating.

A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a sensor data pipelining device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The sensor data pipelining device 619 may carry out or perform any of the operations and processes (e.g., processes 400 and 450) described and shown above. For example, the sensor data pipelining device 619 may facilitate a solution based on "pipelining" of additional requests to cover for the time gaps where there are no pending requests towards the USB sensor. Two solutions may be presented: (1) a device based pipelining, and (2) a host based pipelining. In the device based pipelining, there may be generating the additional requests within the MAUSB device/hub whenever there is no request pending at the USB device. MAUSB host will be capable of receiving responses without generating the matching requests. Such mechanism will be controlled using a new MAUSB protocol enhancement. In the host based pipelining, there may be generating the additional requests within the MAUSB host in advance to cover for predicated gaps in servicing the USB sensor (according to the estimated round trip latency). Such solution is potentially less robust to jitters in the MAUSB link latency but requires no MAUSB protocol change (MAUSB device/hub behaves as today).

The sensor data pipelining device 619 may be used over Interrupt, Bulk or even Isoch endpoints.

The sensor data pipelining device 619 may provide close to wired USB experience for such sensors even though the MAUSB link suffers from much larger latency compared to wired USB.

It is understood that the above are only a subset of what the sensor data pipelining device 619 may be configured to perform and that other functions included throughout this disclosure may also be performed by the sensor data pipelining device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (wireless USB host) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (wireless USB host), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a device comprising processing circuitry coupled to storage, the processing circuitry configured to: identify a first request of one or more requests received from a wireless universal serial bus (USB) host, wherein the first request may be to collect data from a USB sensor; cause to send the first request to the USB sensor; identify a first response from the USB sensor, wherein the first response comprises data collected by the USB sensor based on the first request; determine that no additional requests are received from the wireless USB host; cause to send a second autonomous request to the USB sensor to collect data; identify a second response received from the USB sensor, wherein the second response may be associated with the autonomous second request; and cause to buffer or send the second response to the wireless USB host based on a second request being received from the wireless USB host.

Example 2 may include the device of example 1 and/or some other example herein, wherein the processing circuitry may be further configured to cause to send the second response to the wireless USB host after receiving the second request.

Example 3 may include the device of example 1 and/or some other example herein, wherein the processing circuitry may be further configured to cause to send the first response to the wireless USB host wherein the first response may be associated with the first request received from the wireless USB host.

Example 4 may include the device of example 2 and/or some other example herein, wherein the processing circuitry may be further configured to identify a first acknowledgment received from the wireless USB host, wherein the first acknowledgment may be to acknowledge the first response.

Example 5 may include the device of example 1 and/or some other example herein, wherein the processing circuitry may be further configured to determine to remove the second response from the buffer after receiving a second acknowledgment associated with the second response.

Example 6 may include the device of example 1 and/or some other example herein, wherein the first request and the second autonomous request are sent to the USB sensor and a periodic interval.

Example 7 may include the device of example 1 and/or some other example herein, wherein the wireless USB hub may be a media agnostic universal serial bus (MAUSB) hub and wherein the wireless USB device may be an MAUSB device.

Example 8 may include the device of example 1 and/or some other example herein, further comprising a transceiver configured to transmit and receive wireless signals.

Example 9 may include the device of example 7 and/or some other example herein, further comprising an antenna coupled to the transceiver.

Example 10 may include a non-transitory computer-readable medium storing computer-executable instructions which when executed by one or more processors result in performing operations comprising: identify a first request received from a universal serial bus (USB) class driver, wherein the first request may be associated with collecting first data from a USB sensor; generate a second autonomous request of one or more autonomous requests to collect second data from the USB sensor; cause to send the first request and the one or more second autonomous requests to a wireless USB device; identify a first response associated with the first request received from the wireless USB device; and identify a second response associated with the second autonomous request received from the wireless USB device.

Example 11 may include the non-transitory computer-readable medium of example 10 and/or some other example herein, wherein the first response may be received at a first time instance.

Example 12 may include the non-transitory computer-readable medium of example 10 and/or some other example herein, wherein the second response may be received at a second time instance.

Example 13 may include the non-transitory computer-readable medium of example 10 and/or some other example herein, wherein the operations further comprise identifying a second request received from the USB class driver, wherein the second request may be received at a third time instance.

Example 14 may include the non-transitory computer-readable medium of example 13 and/or some other example herein, wherein the third time instance associated with receiving the second request from the USB class driver may be greater than the time instance associated with the receiving the second response.

Example 15 may include the non-transitory computer-readable medium of example 13 and/or some other example herein, wherein the operations further comprise determining to buffer the second response until receiving the second request.

Example 16 may include a method comprising: identifying, by one or more processors, a first request of one or more requests received from a wireless universal serial bus (USB) host, wherein the first request may be to collect data from a USB sensor; causing to send the first request to the USB sensor; identifying a first response from the USB sensor, wherein the first response comprises data collected by the USB sensor based on the first request; determining that no additional requests are received from the wireless USB host; causing to send a second autonomous request to the USB sensor to collect data; identifying a second response received from the USB sensor, wherein the second response may be associated with the autonomous second request; and causing to buffer or send the second response to the wireless USB host based on a second request being received from the wireless USB host.

Example 17 may include the method of example 1 and/or some other example herein, further comprising causing to send the second response to the wireless USB host after receiving the second request.

Example 18 may include the method of example 1 and/or some other example herein, further comprising causing to send the first response to the wireless USB host wherein the first response may be associated with the first request received from the wireless USB host.

Example 19 may include the method of example 2 and/or some other example herein, further comprising identifying a first acknowledgment received from the wireless USB host, wherein the first acknowledgment may be to acknowledge the first response.

Example 20 may include the method of example 1 and/or some other example herein, further comprising determining to remove the second response from the buffer after receiving a second acknowledgment associated with the second response.

Example 21 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 22 may include an apparatus comprising logic, modules, and/or circuitry to perform one or more elements of a method described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 25 may include a method of communicating in a wireless network as shown and described herein.

Example 26 may include a system for providing wireless communication as shown and described herein.

Example 27 may include a device for providing wireless communication as shown and described herein.

Embodiments according to the invention are in particular disclosed in the attached claims directed to a method, a storage medium, a device, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   identify a first request of one or more requests received from a wireless universal serial bus (USB) host, wherein the first request is to collect data from a USB sensor;
   cause to send the first request to the USB sensor;
   identify a first response from the USB sensor, wherein the first response comprises data collected by the USB sensor based on the first request;
   determine that no additional requests are received from the wireless USB host;
   cause to send a second autonomous request to the USB sensor to collect data;
   identify a second response received from the USB sensor, wherein the second response is associated with the autonomous second request;
   cause to buffer or send the second response to the wireless USB host based on a second request being received from the wireless USB host;
   cause to send the second response to the wireless USB host after receiving the second request; and
   identify a first acknowledgment received from the wireless USB host, wherein the first acknowledgment is to acknowledge the first response.

2. The device of claim 1, wherein the processing circuitry is further configured to cause to send the first response to the wireless USB host wherein the first response is associated with the first request received from the wireless USB host.

3. The device of claim 1, wherein the processing circuitry is further configured to determine to remove the second response from the buffer after receiving a second acknowledgment associated with the second response.

4. The device of claim 1, wherein the first request and the second autonomous request are sent to the USB sensor and a periodic interval.

5. The device of claim 1, wherein the wireless USB host is a media agnostic universal serial bus (MAUSB) host.

6. The device of claim 1, further comprising a transceiver configured to transmit and receive wireless signals.

7. The device of claim 6, further comprising an antenna coupled to the transceiver.

8. A non-transitory computer-readable medium storing computer-executable instructions which when executed by one or more processors result in performing operations comprising:
   identifying a first request received from a universal serial bus (USB) class driver, wherein the first request is associated with collecting first data from a USB sensor;
   generating a second autonomous request of one or more autonomous requests to collect second data from the USB sensor;
   causing to send the first request and the second autonomous request to a wireless USB device;
   identifying a first response associated with the first request received from the wireless USB device;
   identifying a second request received from the USB class driver, wherein the second request is received at a third time instance, wherein the third time instance associated with receiving the second request from the USB class driver is greater than a time instance associated with receiving the second response; and
   identifying a second response associated with the second autonomous request received from the wireless USB device.

9. The non-transitory computer-readable medium of claim 8, wherein the first response is received at a first time instance.

10. The non-transitory computer-readable medium of claim 8, wherein the second response is received at a second time instance.

11. The non-transitory computer-readable medium of claim 8, wherein the operations further comprise determining to buffer the second response until receiving the second request.

12. A method comprising:
   identifying, by one or more processors, a first request of one or more requests received from a wireless universal serial bus (USB) host, wherein the first request is to collect data from a USB sensor;
   causing to send the first request to the USB sensor;
   identifying a first response from the USB sensor, wherein the first response comprises data collected by the USB sensor based on the first request;
   determining that no additional requests are received from the wireless USB host;
   causing to send a second autonomous request to the USB sensor to collect data;
   identifying a second response received from the USB sensor, wherein the second response is associated with the autonomous second request; and
   causing to buffer or send the second response to the wireless USB host based on a second request being received from the wireless USB host;
   causing to send the first response to the wireless USB host wherein the first response is associated with the first request received from the wireless USB host; and
   identifying a first acknowledgment received from the wireless USB host, wherein the first acknowledgment is to acknowledge the first response.

13. The method of claim 12, further comprising causing to send the second response to the wireless USB host after receiving the second request.

14. The method of claim 12, further comprising determining to remove the second response from the buffer after receiving a second acknowledgment associated with the second response.

* * * * *